(12) United States Patent
Kurita

(10) Patent No.: US 12,166,939 B2
(45) Date of Patent: Dec. 10, 2024

(54) IMAGE FORMING APPARATUS INCLUDING A SHIELDING MEMBER USED IN CONNECTION WITH WIRELESS COMMUNICATION

(71) Applicant: Toshiba Tec Kabushiki Kaisha, Tokyo (JP)

(72) Inventor: Eizo Kurita, Sunto Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/333,106

(22) Filed: Jun. 12, 2023

(65) Prior Publication Data
US 2024/0040051 A1     Feb. 1, 2024

(30) Foreign Application Priority Data
Aug. 1, 2022  (JP) ................. 2022-122633

(51) Int. Cl.
H04N 1/32     (2006.01)
H04N 1/00     (2006.01)

(52) U.S. Cl.
CPC ..... H04N 1/32138 (2013.01); H04N 1/00551 (2013.01)

(58) Field of Classification Search
None
See application file for complete search history.

(56) References Cited

U.S. PATENT DOCUMENTS

2021/0377418 A1*  12/2021  Ishida ............... H04N 1/00827
2022/0182501 A1*  6/2022   Jo .................... H04N 1/00342

FOREIGN PATENT DOCUMENTS

| JP | 2003-050978 A | 2/2003 |
| JP | 2008-158750 A | 7/2008 |
| JP | 2009-288960 A | 12/2009 |

* cited by examiner

Primary Examiner — Andrew H Lam
(74) Attorney, Agent, or Firm — Foley & Lardner LLP

(57) ABSTRACT

Provided are an image forming apparatus and a wireless tag communication apparatus capable of wirelessly communicating with an external wireless tag. According to a first aspect of an embodiment, an image forming apparatus includes a conveyance path, an antenna, and a shielding member. On the conveyance path, a sheet is conveyed. The antenna can wirelessly communicate with a first wireless tag of the sheet on the conveyance path. The shielding member shields, at a shielding position, wireless communication between the antenna and a second wireless tag located on a side opposite to the conveyance path with the antenna interposed therebetween. The shielding member moves from the shielding position to an open position to enable wireless communication between the antenna and the second wireless tag.

20 Claims, 5 Drawing Sheets

IMAGE FORMING APPARATUS INCLUDING A SHIELDING MEMBER USED IN CONNECTION WITH WIRELESS COMMUNICATION

CROSS-REFERENCE TO RELATED APPLICATION

This application is based upon and claims the benefit of priority from Japanese Patent Application No. 2022-122633, filed on Aug. 1, 2022, the entire contents of which are incorporated herein by reference.

FIELD

Embodiments described herein relate generally to an image forming apparatus and a wireless tag communication apparatus.

BACKGROUND

An image forming apparatus includes an image former that forms an image on a sheet, and a conveyance path along which the sheet is conveyed. The image forming apparatus may include a wireless tag communication apparatus capable of wirelessly communicating with a first wireless tag of the sheet on the conveyance path. An image forming apparatus and a wireless tag communication apparatus capable of wirelessly communicating with a second wireless tag outside the image forming apparatus are required.

DETAILED DESCRIPTION

Provided are an image forming apparatus and a wireless tag communication apparatus capable of wirelessly communicating with an external wireless tag.

According to a first aspect of an embodiment, an image forming apparatus includes a conveyance path, an antenna, and a shielding member. On the conveyance path, a sheet is conveyed. The antenna can wirelessly communicate with a first wireless tag of the sheet on the conveyance path. The shielding member shields (e.g., blocks, prevents, etc.), at a shielding position, wireless communication between the antenna and a second wireless tag located on a side opposite to the conveyance path with the antenna interposed therebetween. The shielding member moves from the shielding position to enable the wireless communication between the antenna and the second wireless tag.

According to a second aspect of the embodiment, the image forming apparatus according to the first aspect further includes a cover that covers the antenna. The cover includes a window. The window is closed by the shielding member located at the shielding position and is opened by moving the shielding member from the shielding position.

According to a third aspect of the embodiment, in the image forming apparatus according to the first aspect or the second aspect, the sheet is conveyed from a lower side to an upper side on the conveyance path.

According to a fourth aspect of the embodiment, in the image forming apparatus according to any one of the first aspect to the third aspect, the image forming apparatus further includes an image former (e.g., an image forming device, etc.) and a registration roller. The image former is located on the conveyance path and forms an image on the sheet. The registration roller is located upstream of the image former in a conveyance direction of the sheet on the conveyance path. The registration roller conveys the sheet. The antenna can wirelessly communicate with the first wireless tag of the sheet conveyed to the registration roller.

According to a fifth aspect of the embodiment, in the image forming apparatus according to any one of the first aspect to the fourth aspect, the image forming apparatus includes a display panel that displays information for wireless communication with the second wireless tag.

According to a sixth aspect of the embodiment, a wireless tag communication apparatus includes an antenna and a shielding member (e.g., shielding body, shielding apparatus, etc.). The antenna can wirelessly communicate with a first wireless tag of a sheet on a conveyance path along which the sheet is conveyed. The shielding member shields, at a shielding position, wireless communication between the antenna and a second wireless tag located on a side opposite to the conveyance path with the antenna interposed therebetween. The shielding member moves from the shielding position to enable the wireless communication between the antenna and the second wireless tag.

Figure 1:
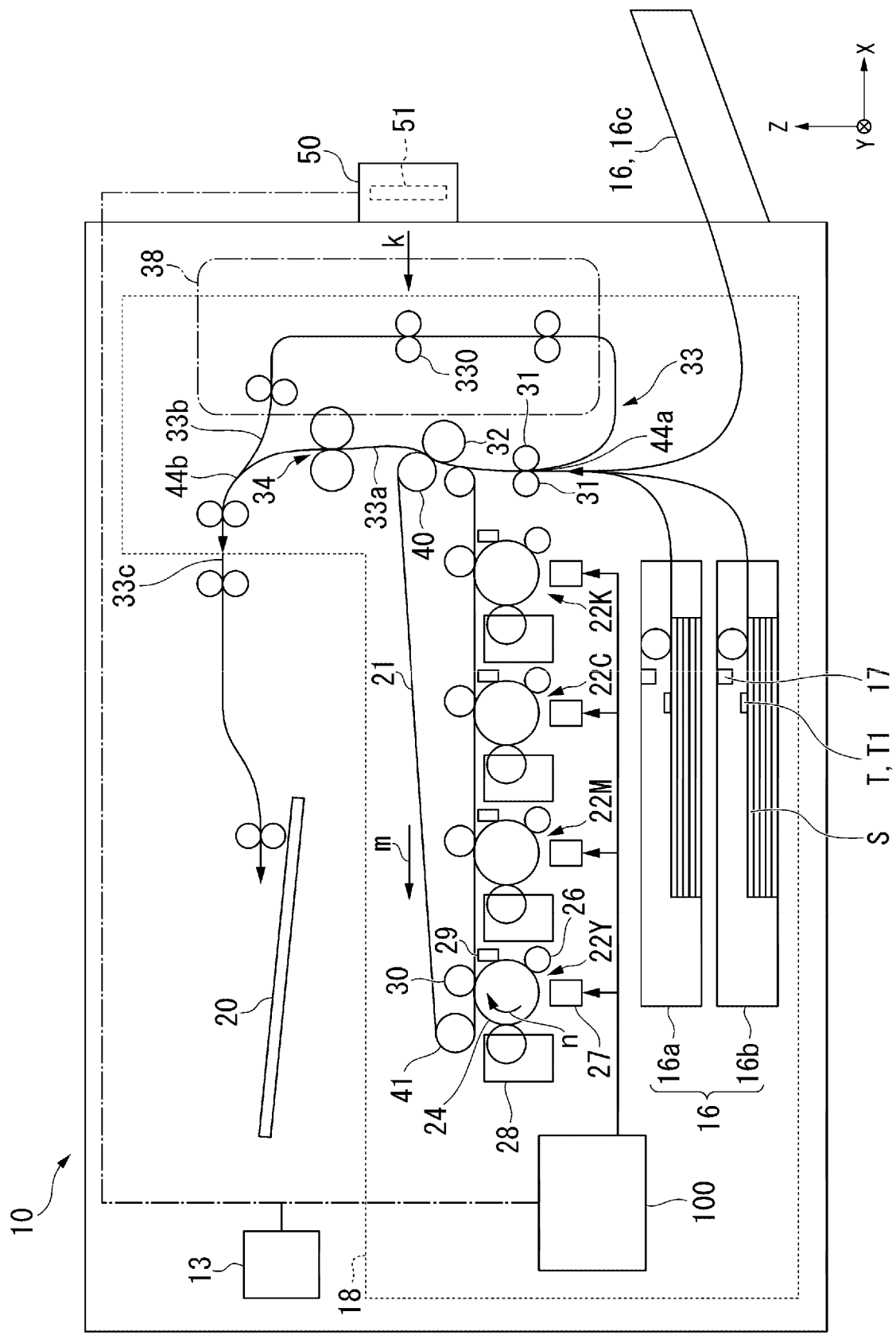
FIG. 1 illustrates an explanatory diagram of a configuration of an image forming apparatus.

Hereinafter, an image forming apparatus and a wireless tag communication apparatus according to an embodiment will be described with reference to the drawings. First, a configuration of an image forming apparatus 10 according to the embodiment will be described with reference to FIG. 1. FIG. 1 is an explanatory diagram illustrating an example of the configuration of the image forming apparatus 10. For example, the image forming apparatus 10 is disposed in a workplace.

In the present application, a Z-direction, an X-direction, and a Y-direction of an orthogonal coordinate system are defined as follows. The Z-direction is an up-down direction of the image forming apparatus 10, and a +Z-direction is an upward direction. The X-direction is a left-right direction of the image forming apparatus 10. A +X-direction is a right direction toward the image forming apparatus 10 and is a direction in which a manual feeding tray 16c is installed. The Y-direction is a front-rear direction of the image forming apparatus 10. For example, the Z-direction is a vertical direction, and the X-direction and the Y-direction are horizontal directions.

In FIG. 1, the image forming apparatus 10 includes a control panel 13, a wireless tag communication apparatus 50, and a printer 18 (e.g., printing device, printing apparatus, etc.). The printer 18 includes a controller 100 and feeding cassettes 16a and 16b. The controller 100 controls the control panel 13, the wireless tag communication apparatus 50, and the printer 18. The controller 100 controls conveyance of a sheet in the printer 18. The control of the conveyance of the sheet is to control conveyance timing of the sheet, a stop position of the sheet, a conveyance speed of the sheet, and the like.

The control panel 13 includes an input key and a display (e.g., a screen, a touchscreen, etc.). For example, the input key receives an input performed by a user. For example, the display is of a touch panel type. The display receives an input performed by the user and performs display for the user. For example, the control panel 13 displays items related to an operation of the image forming apparatus 10 in a settable manner on the display. The control panel 13 notifies the controller 100 of the items set by the user.

The feeding cassettes 16a and 16b store a sheet S provided with a wireless tag T. The feeding cassettes 16a and 16b can also store a sheet S on which no wireless tag T is provided. In the following description, unless otherwise specified, the sheet S is a sheet S provided with the wireless tag T. For example, a material such as paper or a plastic film is used as the sheet S.

The printer 18 performs an operation of forming an image. For example, the printer 18 forms, on a sheet, an image indicated by image data. In the following description, to form an image on a sheet is also referred to as "to print". In the present embodiment, the printer 18 is an apparatus that fixes a toner image. However, the printer 18 is not limited thereto, and may also be an inkjet-type apparatus.

The printer 18 includes an intermediate transfer belt 21. The printer 18 supports the intermediate transfer belt 21 by a driven roller 41, a backup roller 40, and the like. The printer 18 rotates the intermediate transfer belt 21 in a direction indicated by an arrow m. The printer 18 includes four image forming stations 22Y, 22M, 22C, and 22K. The image forming stations 22Y, 22M, 22C, and 22K correspond to Y (yellow), M (magenta), C (cyan), and K (black), respectively. The image forming stations 22Y, 22M, 22C, and 22K are disposed below the intermediate transfer belt 21 along a rotation direction of the intermediate transfer belt 21.

Hereinafter, among the image forming stations 22Y, 22M, 22C, and 22K, the image forming station 22Y for Y (yellow) will be described as an example. Since the image forming stations 22M, 22C, and 22K have the same configuration as that of the image forming station 22Y, detailed description thereof will be omitted.

The image forming station 22Y includes a charger 26, an exposure scanning head 27, a developing apparatus 28, and a photoreceptor cleaner 29. The charger 26, the exposure scanning head 27, the developing apparatus 28, and the photoreceptor cleaner 29 are disposed in a periphery of a photoreceptor drum 24 that rotates in a direction indicated by an arrow n.

The image forming station 22Y includes a primary transfer roller 30. The primary transfer roller 30 faces the photoreceptor drum 24 via the intermediate transfer belt 21.

The charger 26 uniformly charges the photoreceptor drum 24. The exposure scanning head 27 exposes the uniformly charged photoreceptor drum 24 to form an electrostatic latent image on the photoreceptor drum 24. The developing apparatus 28 develops the electrostatic latent image on the photoreceptor drum 24 by using a two-component developer formed of a toner and a carrier.

The primary transfer roller 30 primarily transfers a toner image formed on the photoreceptor drum 24 to the intermediate transfer belt 21. The primary transfer rollers 30 of the image forming stations 22Y, 22M, 22C, and 22K primarily transfer toner images onto the intermediate transfer belt 21, thereby forming a color toner image on the intermediate transfer belt 21. The color toner image is a toner image formed by sequentially superimposing toner images of Y (yellow), M (magenta), C (cyan), and K (black). The photoreceptor cleaner 29 removes a toner remaining on the photoreceptor drum 24 after the primary transfer.

The printer 18 includes a secondary transfer roller 32. The secondary transfer roller 32 faces the backup roller 40 via the intermediate transfer belt 21. The secondary transfer roller 32 secondarily transfers the color toner image on the intermediate transfer belt 21 collectively onto a sheet. The secondary transfer roller 32 functions as an image former that forms an image on the sheet. In the following description, a "toner image" may be either a color toner image or a toner image of only one color. In addition, the toner image may be a toner image using a decolorable toner.

A conveyance path 33 is a path along which a sheet is conveyed by a plurality of conveyance rollers (for example, a conveyance roller 330). The conveyance path 33 includes a first conveyance path 33a, a second conveyance path 33b, and a third conveyance path 33c. The first conveyance path 33a is a conveyance path from a merging portion 44a to a branching portion 44b. The second conveyance path 33b is a conveyance path passing inside a duplex printing apparatus 38 and is a conveyance path from the branching portion 44b to the merging portion 44a, which is different from the first conveyance path 33a. The third conveyance path 33c is a conveyance path from the branching portion 44b to a discharging tray 20.

A sheet is taken out from a sheet placing portion 16 of any one of the feeding cassette 16a, the feeding cassette 16b, and the manual feeding tray 16c. A registration roller 31 is disposed upstream of the secondary transfer roller 32 in a conveyance direction of the sheet on the first conveyance path 33a. The sheet taken out from the sheet placing portion 16 is conveyed to a portion in contact with two stopped registration rollers 31. The sheet is temporarily stopped at the portion in contact with the two stopped registration rollers 31. At this time, a leading end of the sheet abuts against the registration roller 31, and inclination of the sheet is corrected. The controller 100 starts rotation of the registration roller 31 in accordance with a position of the toner image on the rotating intermediate transfer belt 21 so as to move the sheet to a position of the secondary transfer roller 32.

The toner image formed on the intermediate transfer belt 21 is secondarily transferred to the sheet by the secondary transfer roller 32. Further, the secondarily transferred toner image is fixed on the sheet by a fixing apparatus 34. In this way, an image is formed on the sheet under control of the controller 100. The controller 100 conveys the sheet on which the toner image is fixed by the fixing apparatus 34 to the third conveyance path 33c, and discharges the sheet.

The wireless tag communication apparatus 50 includes a calculation apparatus, a memory apparatus, and an antenna 51. A wireless tag in the embodiment is, for example, a radio frequency identifier (RFID) tag. The wireless tag communication apparatus 50 transmits radio waves in a direction indicated by an arrow k, for example. The wireless tag communication apparatus 50 communicates with the wireless tag T provided on the sheet S via the antenna 51. For example, the wireless tag communication apparatus 50 can wirelessly communicate with the wireless tag T of the sheet S temporarily stopped by the registration roller 31 on the first conveyance path 33a. Specifically, the wireless tag communication apparatus 50 reads information from the wireless tag T and writes information into the wireless tag T.

For example, when the sheet is used for logistics, the information to be written into the wireless tag includes information indicating contents, information indicating a destination, and contents to be printed on the sheet. In the embodiment, the wireless tag communication apparatus 50 uses, for example, a radio wave system of 900 MHz band (UHF). However, the RFID method and the frequency band are not limited to those described above, and other methods and other frequency bands may be adopted.

The controller 100 controls each unit of the image forming apparatus 10.

Figure 2:
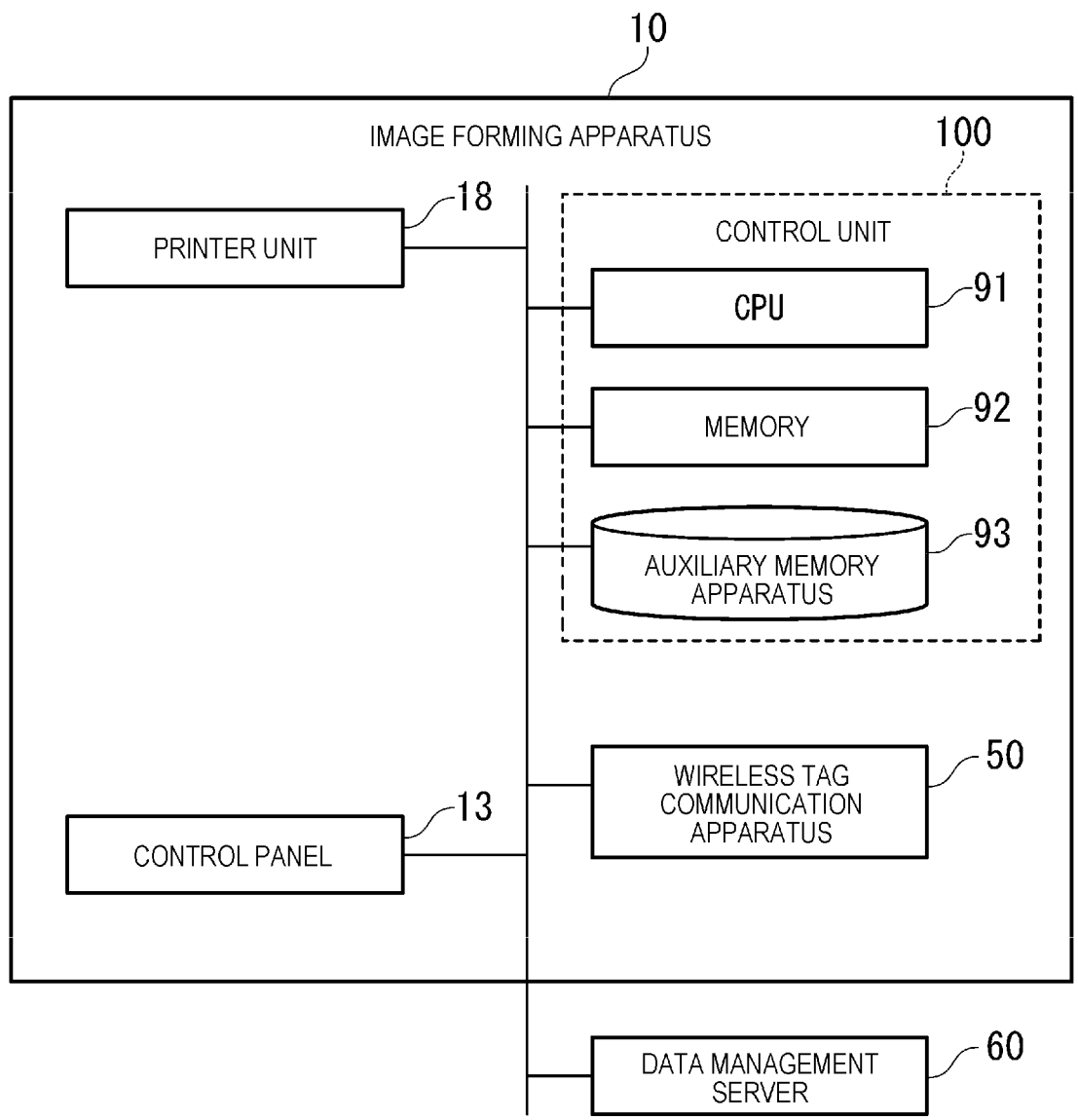
FIG. 2 illustrates a hardware configuration diagram of the image forming apparatus.

FIG. 2 is a hardware configuration diagram of an image processing apparatus. The image forming apparatus 10 includes a central processing unit (CPU) 91, a memory 92, an auxiliary memory apparatus 93, and the like connected by a bus, and executes a program. The image forming apparatus 10 functions as an apparatus including the printer 18, the control panel 13, and the wireless tag communication apparatus 50 by executing the program.

The CPU 91 functions as the control unit 100 by executing programs stored in the memory 92 and the auxiliary memory apparatus 93. The control unit 100 controls an operation of each functional unit of the image forming apparatus 10.

The auxiliary memory apparatus 93 is implemented by a memory apparatus such as a magnetic hard disk apparatus or a semiconductor memory apparatus. The auxiliary memory apparatus 93 stores information.

The image forming apparatus 10 is connected to a data management server 60 which is a higher-level system. The data management server 60 stores information on the wireless tag.

The wireless tag communication apparatus 50 will be described in detail.

Figure 3:
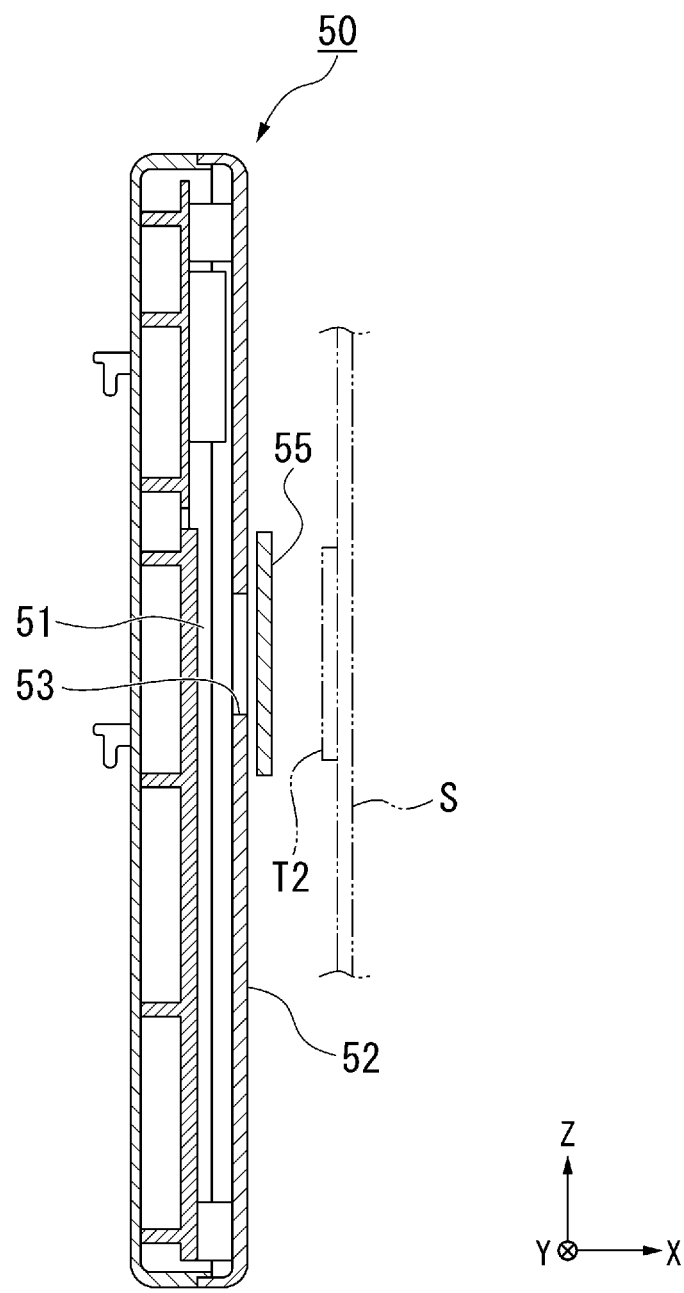
FIG. 3 illustrates a cross-sectional view of a wireless tag communication apparatus.
Figure 4:
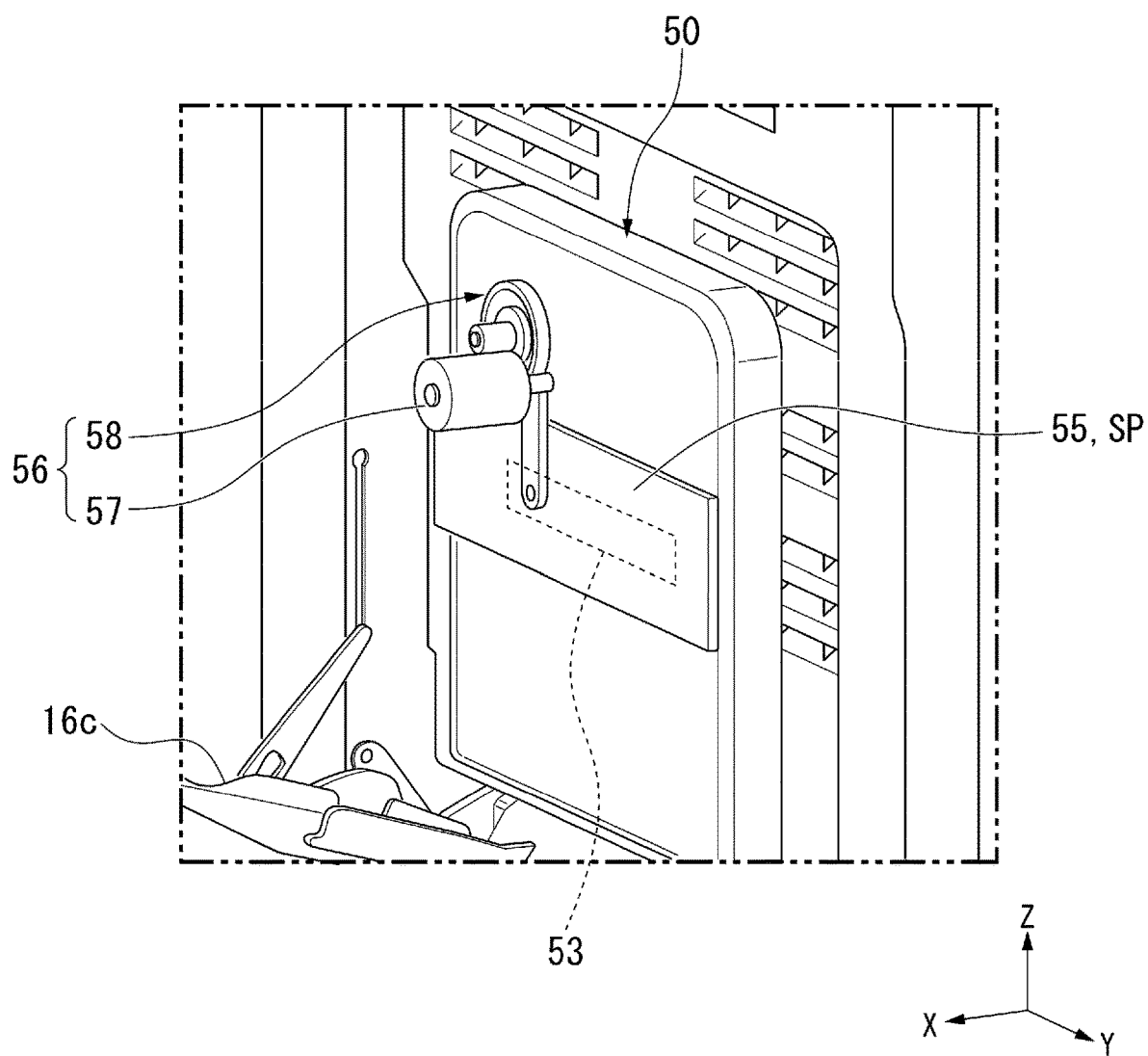
FIG. 4 illustrates a perspective view of the wireless tag communication apparatus in a state in which a shielding plate is closed.
Figure 5:
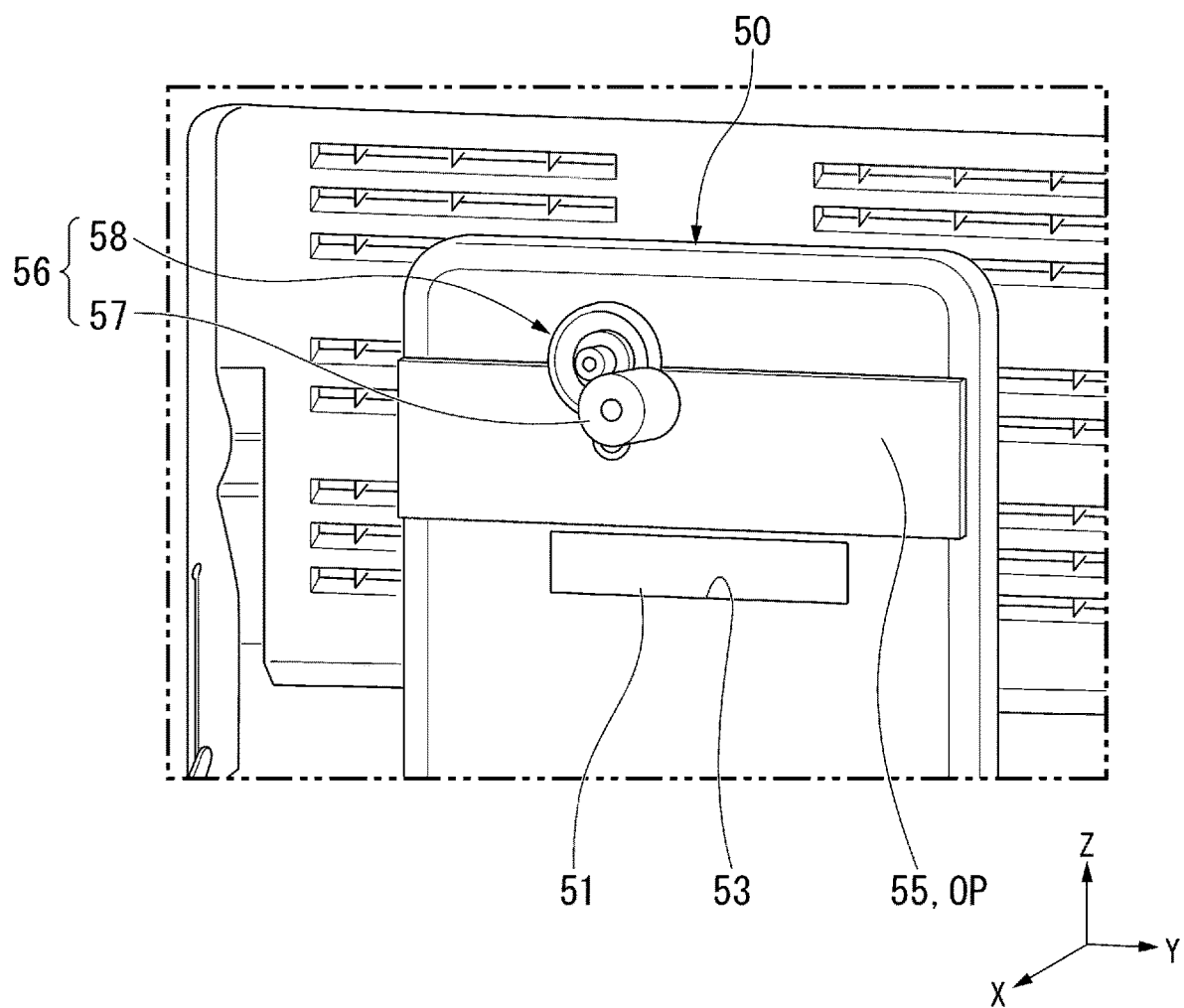
FIG. 5 illustrates a perspective view of the wireless tag communication apparatus in a state in which the shielding plate is opened.

FIG. 3 is a cross-sectional view of the wireless tag communication apparatus. FIG. 4 is a perspective view of the wireless tag communication apparatus in a state in which a shielding plate is closed. FIG. 5 is a perspective view of the wireless tag communication apparatus in a state in which the shielding plate is opened.

As illustrated in FIG. 4, the wireless tag communication apparatus 50 has a substantially rectangular flat disc shape. For example, the wireless tag communication apparatus 50 is disposed along an +X-direction end surface of a housing of the image forming apparatus 10 such that a thickness direction thereof is along the X-direction. The image forming apparatus 10 includes the manual feeding tray 16c on the +X-direction end surface. The manual feeding tray 16c can be opened and closed with respect to the housing of the image forming apparatus 10. The wireless tag communication apparatus 50 is disposed in the −X-direction (inside the image forming apparatus of the manual feeding tray 16c when the manual feeding tray 16c is closed. The wireless tag communication apparatus 50 is exposed to the outside of the image forming apparatus 10 when the manual feeding tray 16c is opened. The wireless tag communication apparatus 50 may be disposed in a place different from that described above.

As illustrated in FIG. 3, the wireless tag communication apparatus 50 includes the antenna 51, a cover 52, and a shielding plate (shielding member) 55.

The antenna 51 has a flat plate shape. The antenna 51 is disposed at a center of the wireless tag communication apparatus 50 in the X-direction such that a thickness direction thereof coincides with the X-direction. The antenna 51 transmits and receives radio waves in the ±X-directions. The antenna 51 may be a combination of a unidirectional antenna that transmits and receives radio waves in the +X-direction and a unidirectional antenna that transmits and receives radio waves in the −X-direction.

As illustrated in FIG. 1, the first conveyance path 33a that conveys the sheet is provided in the −X-direction of the antenna 51. The first conveyance path 33a is a vertical conveyance path along which the sheet is conveyed from a lower side to an upper side. The antenna 51 can wirelessly communicate with a first wireless tag T1 of the sheet S temporarily stopped by the registration roller 31 on the first conveyance path 33a. The antenna 51 transmits and receives radio waves in the −X-direction and wirelessly communicates with the first wireless tag T1. The antenna 51 reads information from the first wireless tag T1 and writes information into the first wireless tag T1. No members shield radio waves between the vicinity of the registration roller 31 and the antenna 51 on the first conveyance path 33a.

As illustrated in FIG. 3, the antenna 51 can wirelessly communicate with a second wireless tag T2 of the sheet S in the +X-direction. The second wireless tag T2 is located on a side opposite to the first conveyance path 33a with the antenna 51 interposed therebetween. The antenna 51 transmits and receives radio waves in the +X direction, and wirelessly communicates with the second wireless tag T2. The antenna 51 reads information from the second wireless tag T2 and writes information into the second wireless tag T2.

The cover 52 is formed of a resin material, a metal material, or the like. The cover 52 covers (e.g., encapsulates, surrounds, etc.) the antenna 51. The cover 52 includes a window 53.

The window (opening) 53 is located in the vicinity of a center of a +X-direction end plate of the cover 52 in the Y-direction and the Z-direction. As illustrated in FIG. 5, the window 53 has a rectangular shape with the Y-direction as a longitudinal direction and the Z-direction as a short direction. The window 53 penetrates the +X-direction end plate of the cover 52 in the X-direction. The window 53 exposes a +X-direction surface of the antenna 51 to the outside of the wireless tag communication apparatus 50.

The shielding plate 55 is made of a conductive metal material that shields radio waves. The shielding plate 55 has a substantially flat plate shape, and a thickness direction thereof is along the X-direction. The shielding plate 55 has a substantially rectangular shape and has a longitudinal direction along the Y-direction and a short direction along the Z-direction. A length of the shielding plate 55 in the Y-direction is longer than a length of the window 53 in the Y-direction. A length of the shielding plate 55 in the Z-direction is longer than a length of the window 53 in the Z-direction. The shielding plate 55 is disposed in the +X-direction of the +X-direction end plate of the cover 52 in parallel with the end plate.

The wireless tag communication apparatus 50 includes a shielding plate driving mechanism 56 that moves the shielding plate 55 in the Z-direction. For example, the shielding plate driving mechanism 56 includes a motor 57 and a rack-and-pinion mechanism 58 (e.g., a linear actuator and circular gear, etc.). The rack-and-pinion mechanism 58 includes a pinion gear that is rotationally driven by the motor 57 and a rack gear that is attached to the shielding plate 55. When the motor 57 rotates the pinion gear, the rack gear meshing with the pinion gear moves in the Z-direction, and the shielding plate 55 moves in the Z-direction. The shielding plate driving mechanism 56 may be a solenoid. The wireless tag communication apparatus 50 may not include the shielding plate driving mechanism 56, and the shielding plate 55 may be manually movable in the Z-direction.

The shielding plate 55 is movable in the Z-direction between a shielding position SP (see FIG. 4) where the window 53 is closed and an open position OP (see FIG. 5) where the window 53 is opened. For example, the open position OP is in the +Z-direction of the shielding position SP.

At the shielding position SP illustrated in FIG. 4, the shielding plate 55 is disposed in the +X-direction of the entire window 53 and a periphery of the window 53. The shielding plate 55 located at the shielding position SP shields wireless communication between the second wireless tag T2 (see FIG. 3) located in the +X-direction of the antenna 51 and the antenna 51.

At the open position OP illustrated in FIG. 5, the entire window 53 and the periphery of the window 53 are exposed in the +X-direction. The shielding plate 55 moves from the shielding position SP to the open position OP to enable the wireless communication between the antenna 51 and the second wireless tag T2 (see FIG. 3).

A method of using the image forming apparatus 10 will be described. A method of reading a first dataset from the first wireless tag T1 of the sheet S on the first conveyance path 33*a* (e.g., a first reading mode) will be described.

The user of the image forming apparatus 10 fills the sheet placing portion 16 illustrated in FIG. 1 with a plurality of sheets S. The user selects the first reading mode on the control panel 13. The plurality of sheets S are supplied one by one from the sheet placing portion 16 to the first conveyance path 33*a*. The registration roller 31 on the first conveyance path 33*a* temporarily stops the sheet S to adjust a position (e.g., an orietation, etc.) of the sheet S. The antenna 51 of the wireless tag communication apparatus 50 wirelessly communicates with the first wireless tag T1 of the sheet S conveyed to the registration roller 31. The controller 100 reads the first dataset from the first wireless tag T1 via the antenna 51. The controller 100 displays the read first dataset on the control panel 13. The controller 100 may record (e.g., store, etc.) the first dataset in the data management server 60 (see FIG. 2). The controller 100 forms a predetermined image on the sheet S from which the first data is read.

The controller 100 may compare the read first dataset with a second dataset acquired in advance. The second dataset is recorded (e.g., stored, etc.) in the data management server 60 in advance (e.g., prior to acquiring the first dataset, etc.). The controller 100 displays a comparison result between the first dataset and the second dataset on the control panel 13. The controller 100 may record the comparison result in the data management server 60.

A method of writing the second dataset into the first wireless tag T1 of the sheet S on the first conveyance path 33*a* (e.g., a first writing mode) will be described.

The second dataset is recorded in the data management server 60 in advance. For exmaple, the second dataset may be programmed and stored in the data management server 60 before the user intends to use the image forming apparatus 10. The user selects the first writing mode on the control panel 13. The user selects the second dataset on the control panel 13. The controller 100 reads the second dataset from the data management server 60. The antenna 51 of the wireless tag communication apparatus 50 wirelessly communicates with the first wireless tag T1 of the sheet S conveyed to the registration roller 31. The controller 100 writes the second dataset into the first wireless tag T1 via the antenna 51. The controller 100 forms a predetermined image on the sheet S in which the second data is written.

In the first reading mode and the first writing mode, the antenna 51 wirelessly communicates with the first wireless tag T1 of the sheet S on the first conveyance path 33*a*. At this time, it is necessary to prevent the antenna 51 from wirelessly communicating with any other wireless tag. As illustrated in FIG. 5, when the shielding plate 55 is located at the open position OP, the antenna 51 may wirelessly communicate with another wireless tag. When the user selects the first reading mode or the first writing mode on the control panel 13, the controller 100 moves the shielding plate 55 from the open position OP to the shielding position SP illustrated in FIG. 4. Accordingly, wireless communication between the antenna 51 and the other wireless tag is prevented.

A method of reading the first dataset from the second wireless tag T2 of the sheet S in the +X-direction of the wireless tag communication apparatus 50 (e.g., a second reading mode) will be described.

When the manual feeding tray 16*c* of the image forming apparatus 10 illustrated in FIG. 1 is closed, the user opens the manual feeding tray 16*c* to expose the wireless tag communication apparatus 50. The user selects the second reading mode on the control panel 13. The controller 100 moves the shielding plate 55 from the shielding position SP illustrated in FIG. 4 to the open position OP illustrated in FIG. 5. The window 53 of the wireless tag communication apparatus 50 is opened, and the +X-direction surface of the antenna 51 is exposed to the outside. The user holds the sheet S illustrated in FIG. 3 and disposes the sheet S in the +X-direction of the wireless tag communication apparatus 50. The user brings the second wireless tag T2 of the sheet S close to the window 53 of the wireless tag communication apparatus 50. The antenna 51 wirelessly communicates with the second wireless tag T2 of the sheet S located in the +X-direction of the wireless tag communication apparatus 50. The controller 100 reads the first dataset from the second wireless tag T2 via the antenna 51. The controller 100 displays the read first dataset on the control panel 13. The controller 100 may record the first data in the data management server 60.

The controller 100 may compare the read first dataset with the second dataset acquired in advance. The second dataset is recorded in the data management server 60 in advance. The controller 100 displays the comparison result between the first dataset and the second dataset on the control panel 13. The controller 100 may record the comparison result in the data management server 60.

A method of writing the second dataset into the second wireless tag T2 of the sheet S located in the +X-direction of the wireless tag communication apparatus 50 (e.g., a second writing mode) will be described.

The user selects the second writing mode on the control panel 13. The user inputs the second dataset to the control panel 13. The controller 100 moves the shielding plate 55 from the shielding position SP to the open position OP The window 53 of the wireless tag communication apparatus 50 is opened, and the +X-direction surface of the antenna 51 is exposed to the outside. The user brings the second wireless tag T2 of the sheet S close to the window 53 of the wireless tag communication apparatus 50. The antenna 51 wirelessly communicates with the second wireless tag T2 of the sheet S located in the +X-direction of the wireless tag communication apparatus 50. The controller 100 writes the second dataset into the second wireless tag T2 via the antenna 51. The controller 100 may record the second dataset in the data management server 60.

As described above in detail, the image forming apparatus 10 according to the embodiment includes the first conveyance path 33*a*, the antenna 51, and the shielding plate 55. The sheet S is conveyed on the first conveyance path 33*a*.

The antenna 51 can wirelessly communicate with the first wireless tag T1 of the sheet S on the first conveyance path 33a. The shielding plate 55 shields wireless communication between the second wireless tag T2 located on the side opposite to the first conveyance path 33a with the antenna 51 interposed therebetween and the antenna 51 at the shielding position SP The shielding plate 55 moves from the shielding position SP to enable the wireless communication between the antenna 51 and the second wireless tag T2.

The second wireless tag T2 is located on the side opposite to the first conveyance path 33a with the antenna 51 interposed therebetween. The shielding plate 55 moves from the shielding position SP to enable the wireless communication between the antenna 51 and the second wireless tag T2. The image forming apparatus 10 can wirelessly communicate with the second wireless tag T2 located outside. Since the wireless communication is performed with the second wireless tag T2 located outside, it is not necessary to prepare a wireless tag communication apparatus including an antenna different from the antenna 51 of the image forming apparatus 10. The shielding plate 55 shields, at the shielding position SP, the wireless communication between the antenna 51 and the second wireless tag T2. When the antenna 51 wirelessly communicates with the first wireless tag T1 of the sheet S on the first conveyance path 33a, the wireless communication with the second wireless tag T2 located outside is prevented.

The image forming apparatus 10 further includes the cover 52 which covers the antenna 51. The cover 52 includes the window 53. The window 53 is closed by the shielding plate 55 located at the shielding position SP and is opened by moving the shielding plate 55 from the shielding position SP.

The window 53 is closed by the shielding plate 55 located at the shielding position SP, and the wireless communication between the second wireless tag T2 and the antenna 51 is shielded (e.g., prevented, blocked, etc.). When the shielding plate 55 moves from the shielding position SP and the window 53 is opened, the wireless communication between the second wireless tag T2 and the antenna 51 is available. Availability of the wireless communication between the second wireless tag T2 and the antenna 51 is accurately implemented.

On the first conveyance path 33a, the sheet S is conveyed from the lower side to the upper side.

The antenna 51 can wirelessly communicate with the first wireless tag T1 of the sheet S on the first conveyance path 33a which is a vertical conveyance path.

The image forming apparatus 10 further includes the secondary transfer roller 32 and the registration roller 31. The secondary transfer roller 32 is on the first conveyance path 33a and forms an image on the sheet S. The registration roller 31 is located upstream of the secondary transfer roller 32 in the conveyance direction of the sheet S on the first conveyance path 33a. The registration roller 31 temporarily stops the conveyance of the sheet S. The antenna 51 can wirelessly communicate with the first wireless tag T1 of the sheet S temporarily stopped by the registration roller 31.

Since the wireless communication is performed with the first wireless tag T1 of the temporarily stopped sheet S, the wireless communication is likely to be successful. Since the temporary stop of the sheet S by the registration roller 31 is used and the sheet S is not temporarily stopped at any other place, a decrease in printing productivity is prevented.

The image forming apparatus 10 includes the control panel 13 that displays information for the wireless communication with the second wireless tag T2.

The control panel 13 displays the first data read from the second wireless tag T2 and the second data to be written into the second wireless tag T2. Convenience of the image forming apparatus 10 for the user is improved.

The wireless tag communication apparatus 50 includes the antenna 51 and the shielding plate 55. The antenna 51 can wirelessly communicate with the first wireless tag T1 of the sheet S on the first conveyance path 33a along which the sheet S is conveyed. The shielding plate 55 shields, at the shielding position SP, the wireless communication between the antenna 51 and the second wireless tag T2 located on the side opposite to the first conveyance path 33a with the antenna 51 interposed (e.g., positioned) therebetween. The shielding plate 55 moves from the shielding position SP to enable the wireless communication between the antenna 51 and the second wireless tag T2.

The wireless tag communication apparatus 50 can wirelessly communicate with the second wireless tag T2 located outside the image forming apparatus 10. Since the wireless communication is performed with the second wireless tag T2 located outside the image forming apparatus 10, it is not necessary to prepare a wireless tag communication apparatus including an antenna different from the antenna 51. When the antenna 51 wirelessly communicates with the first wireless tag T1 of the sheet S on the first conveyance path 33a, the wireless communication with the second wireless tag T2 located outside is prevented.

According to at least one embodiment described above, the shielding plate 55 is provided, which moves from the shielding position SP to enable the wireless communication between the antenna 51 and the second wireless tag T2. Accordingly, it is possible to perform wireless communication with the second wireless tag T2 located outside.

Although certain embodiments are described, the embodiments are presented as examples and are not intended to limit the scope of the disclosure. The embodiments can be implemented in various other forms, and various omissions, substitutions, and changes can be made without departing from the gist of the disclosure. The embodiments and variations thereof are included within the scope and gist of the disclosure and the scope of the claims and equivalents thereof

What is claimed is:

1. An image forming apparatus comprising:
a conveyance path along which a sheet is conveyed;
an antenna configured to wirelessly communicate with a first wireless tag of the sheet on the conveyance path; and
a shielding member configured to prevent, at a shielding position, wireless communication between the antenna and a second wireless tag located on a side opposite to the conveyance path with the antenna interposed therebetween, and to move from the shielding position to an open position to enable wireless communication between the antenna and the second wireless tag.

2. The apparatus according to claim 1, further comprising:
a cover configured to cover the antenna; and
a window defined by the cover, the window selectively closed by moving the shielding member to the shielding position and selectively opened by moving the shielding member from the shielding position to the open position.

3. The apparatus according to claim 1, wherein the sheet is conveyed from a lower side to an upper side on the conveyance path.

4. The apparatus according to claim 1, further comprising:
an image former that is located on the conveyance path and configured to form an image on the sheet;
a registration roller positioned upstream of the image former in a conveyance direction of the sheet on the conveyance path and configured to convey the sheet; and
wherein the antenna is configured to wirelessly communicate with the first wireless tag of the sheet conveyed to the registration roller.

5. The apparatus according to claim 1, further comprising:
a display panel configured to display information for wireless communication with the second wireless tag.

6. A wireless tag communication apparatus comprising:
an antenna configured to wirelessly communicate with a first wireless tag of a sheet on a conveyance path along which the sheet is conveyed; and
a shielding member configured to prevent, at a shielding position, wireless communication between the antenna and a second wireless tag located on a side opposite to the conveyance path with the antenna interposed therebetween, and to move from the shielding position to an open position to enable wireless communication between the antenna and the second wireless tag.

7. The wireless tag communication device of claim 6, further comprising:
a cover configured to cover the antenna; and
a window defined by the cover, the window selectively closed by moving the shielding member to the shielding position and selectively opened by moving the shielding member from the shielding position to the open position.

8. The wireless tag communication device of claim 7, wherein when the shielding member is in the open position, the window exposes a surface of the antenna.

9. The wireless tag communication device of claim 6, wherein the wireless tag communication apparatus is configured to read information from a wireless tag and write information into the wireless tag.

10. The wireless tag communication device of claim 9, wherein the information to be written into the wireless tag includes at least one of information indicating contents, information indicating a destination, or contents to be printed on the sheet.

11. The wireless tag communication device of claim 6, wherein the antenna is further configured to wirelessly communicate with the second wireless tag of the sheet by placing the second wireless tag adjacent to the window.

12. The wireless tag communication device of claim 6, further comprising:
a shielding plate driving mechanism configured to move the shielding member from the shielding position to the open position.

13. The wireless tag communication device of claim 12, wherein the shielding plate driving mechanism comprises:
a motor;
a pinion gear rotationally driven by the motor; and
a rack gear coupled to the shielding plate, the rack gear configured to contact the pinion gear, wherein the pinion gear rotates along the rack gear.

14. The wireless tag communication device of claim 6, wherein the shielding member is manually opened by a user to expose a surface of the antenna.

15. The wireless tag communication device of claim 6, further comprising a calculation apparatus and a memory apparatus.

16. A method of processing information comprising:
providing a sheet to a first conveyance path of an image forming apparatus, the sheet comprising:
a first wireless tag, and
a second wireless tag;
selecting a first reading mode;
reading, by a controller, information from a first dataset from the first wireless tag;
displaying, by a control panel, the first dataset;
forming, by the image forming apparatus, a first image on the sheet, based on information from the first dataset;
reading, by the controller, a second dataset;
selecting a first writing mode;
writing, by the controller through an antenna, the second dataset into the first wireless tag; and
forming, by the image forming apparatus, a second image on the sheet based on the second dataset.

17. The method of claim 16, further comprising:
comparing the first dataset to the second dataset; and
displaying, by the control panel, a comparison result between the first dataset and the second dataset.

18. The method of claim 16, wherein the second dataset is acquired and stored in a data management server prior to reading information from the first dataset.

19. The method of claim 16, further comprising:
selecting a second reading mode;
moving, by the controller, a shielding member to expose a surface of the antenna through a window;
placing the second wireless tag adjacent to the window;
reading, by the antenna, a second first dataset from the second wireless tag;
displaying, by the control panel, the second first dataset;
selecting a second writing mode; and
writing, by the antenna, the second dataset onto the second wireless tag.

20. The method of claim 18, further comprising:
comparing the second first dataset to the second dataset; and
displaying, by the control panel, a comparison result between the second first dataset and the second dataset.

* * * * *